(No Model.)
W. D. PARKS & T. S. KIRBY.
HARROW.
No. 590,274. Patented Sept. 21, 1897.
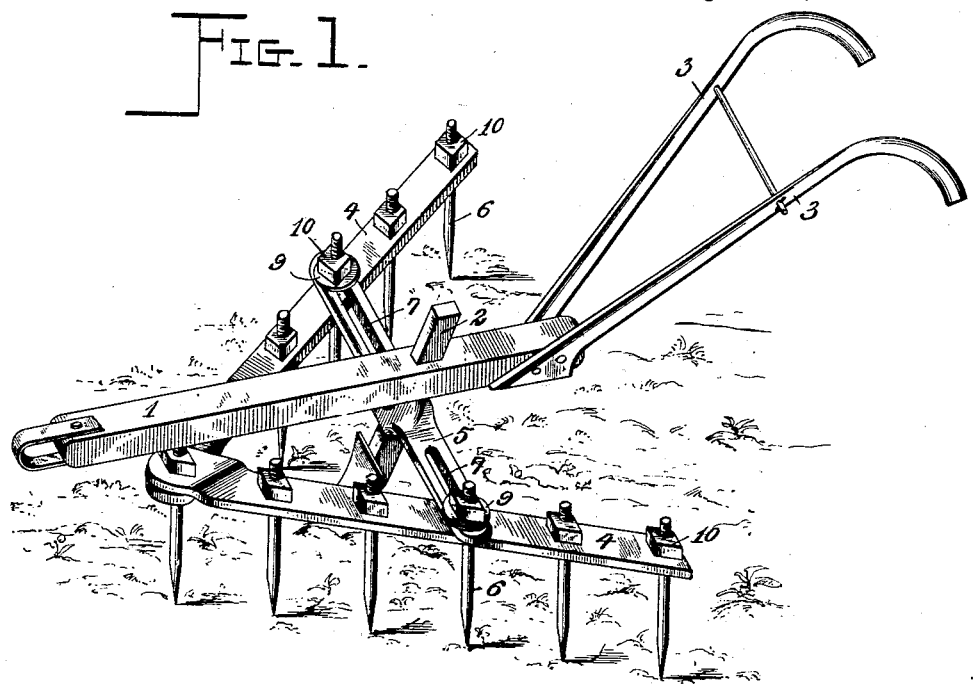
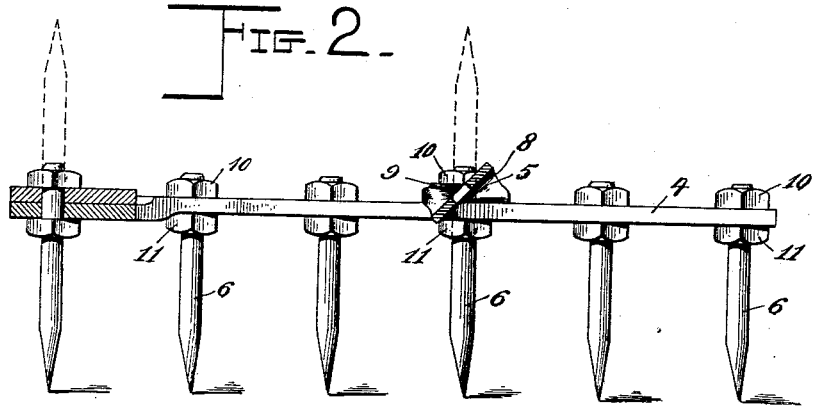
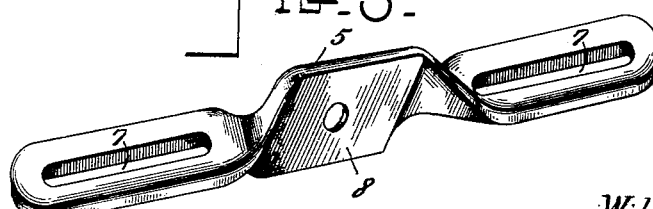
Witnesses
John A. Senfarwick
U. B. Hillyard.
By their Attorneys,
Inventors
William D. Parks,
Thomas S. Kirby.
C. A. Snow & Co.

UNITED STATES PATENT OFFICE.

WILLIAM D. PARKS AND THOMAS S. KIRBY, OF SCOTTSBOROUGH, ALABAMA.

HARROW.

SPECIFICATION forming part of Letters Patent No. 590,274, dated September 21, 1897.

Application filed May 27, 1897. Serial No. 638,438. (No model.)

*To all whom it may concern:*

Be it known that we, WILLIAM D. PARKS and THOMAS S. KIRBY, citizens of the United States, residing at Scottsborough, in the county of Jackson and State of Alabama, have invented a new and useful Harrow, of which the following is a specification.

This invention relates to harrows and implements of like formation for pulverizing and loosening the soil, which is essential to securing a full harvest under favorable conditions.

The purpose of the improvement is to supply a long-felt want by providing a harrow comprising the fewest number of parts possible consistent with the various adjustments, whereby it is adapted for a wide range of uses to meet various conditions both of soil, location, and character of work to be performed.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a perspective view showing the invention applied to a plow of ordinary construction. Fig. 2 is a longitudinal section, the plow-beam being omitted and the dotted lines showing the reversed position of some of the harrow-teeth. Fig. 3 is a detail view of the spreader or coupling-bar.

Corresponding and like parts are referred to in the following description and indicated in the several views of the drawings by the same reference-characters.

The plow is of common form and comprises a beam 1, a standard or plow-stock 2, bearing a shovel or point, and handles 3 for guiding and manipulating the implement in the usual way.

The gist of the invention resides in the harrow attachment, which is of V form and composed of bars 4, pivotally connected at their front ends and held any required distance apart at their rear ends by means of a spreader or coupling-bar 5, the latter having adjustable connection at its ends with the respective bars and the latter provided at intervals in their length with harrow-teeth 6. While the bars may be formed of wood or other desired material, it is preferred to construct them of metal for the sake of lightness and lasting qualities. The front ends of the bars 4 are offset and are constructed to overlap and are pivotally connected by the front harrow-tooth, the latter serving in the dual capacity of a fastening means for the bars 4 and as an earth-treating device. When it is required to throw the front harrow-tooth out of action, it is disconnected from the bars 4 and inverted, as indicated by the dotted lines in Fig. 2, and in this position the tooth, while out of action, still serves as a fastening for connecting the bars 4.

The spreader or coupling-bar 5 is formed of metal and has longitudinal slots 7 at its ends, through which pass the threaded end portions of intermediate teeth, whereby the coupling and toothed bars 4 are held together in an adjusted position. This spreader or coupling-bar has an intermediate portion bent to extend at an angle of about thirty degrees to the plane of the harrow-frame, as shown at 8, and this bent or twisted portion 8 is apertured to receive a bolt, by means of which the standard or plow-stock 2 is rigidly fastened thereto. By having the intermediate portion of the coupling-bar bent, as indicated at 8, an extended surface is had for the standard or plow-stock 2, and shoulders are provided to engage with the sides thereof to prevent a relative turning of the said standard, whereby it is possible to practically use a single bolt for securing an effective and rigid joint between the parts 2 and 5. Washers 9 are mounted upon the threaded ends of the harrow-teeth passing through the slots 7 and are interposed between the end portions of the coupling-bar and the nuts 10, mounted upon the threaded extremities of the harrow-teeth 6. By loosening the nuts 10 the bars 4 may be separated or brought closer together at their free ends, according to the spread required, the bars being held in an adjusted position by retightening the nuts 10 when moved to the required position.

All the harrow-teeth 6 are similarly constructed, and their active ends are pointed and their attaching ends threaded to receive nuts 10 and companion nuts 11, the bars 4 being clamped between the upper and lower sets of nuts. The harrow-teeth, in addition to being secured in place by the nuts 10 and 11, are capable of relative adjustment by backing one of the nuts and moving the other forward, as will be readily understood. Any one or more of the harrow-teeth may be thrown out of action by reversing their position, as will be readily understood and as indicated by the dotted lines in Fig. 2.

Having thus described the invention, what is claimed as new is—

1. In an agricultural implement of the character set forth, the combination of toothed bars having pivotal connection at one end, a spreader or coupling-bar having adjustable connection at its ends with the toothed bars, whereby the latter may be separated or brought closer together at their rear or free ends, said coupling-bar having an intermediate portion bent or partially twisted and forming shoulders at each end of the inclined part formed thereby, and a plow-stock secured to the inclined portion of the coupling-bar and having the shoulders at the ends thereof embracing its sides, substantially as set forth for the purpose specified.

2. The herein-described harrow attachment, comprising bars having their front ends offset and overlapping, a spreader or coupling-bar having its end portions longitudinally slotted and its intermediate portion bent or partially twisted to provide an inclined part having shoulders at the ends thereof, and harrow-teeth at intervals in the length of the bars, the front harrow-tooth pivotally connecting the said bars and intermediate harrow-teeth adjustably connecting the coupling-bar with the frame or side bars, the said harrow-teeth having their attaching ends threaded and receiving nuts between which the bars are clamped, substantially as set forth.

In testimony that we claim the foregoing as our own we have hereto affixed our signatures in the presence of two witnesses.

WILLIAM D. PARKS.
THOMAS S. KIRBY.

Witnesses:
J. L. BURGESS,
ANDREW BOYD.